United States Patent
Leonelli et al.

(10) Patent No.: US 10,067,490 B2
(45) Date of Patent: Sep. 4, 2018

(54) METHOD AND APPARATUS FOR MODIFYING BEHAVIOR OF CODE FOR A CONTROLLER-BASED DEVICE

(71) Applicant: Ciambella Ltd., Tortola (VG)

(72) Inventors: Jean-Baptiste Leonelli, Levallois (FR); Trisala Chandaria, New York, NY (US)

(73) Assignee: Ciambella Ltd., Tortola (VG)

( * ) Notice: Subject to any disclaimer, the term of this patent is extended or adjusted under 35 U.S.C. 154(b) by 0 days.

(21) Appl. No.: 15/063,764

(22) Filed: Mar. 8, 2016

(65) Prior Publication Data

US 2016/0327925 A1 Nov. 10, 2016

Related U.S. Application Data

(60) Provisional application No. 62/190,408, filed on Jul. 9, 2015, provisional application No. 62/158,636, filed on May 8, 2015, provisional application No. 62/270,107, filed on Dec. 21, 2015.

(51) Int. Cl.
  *G06F 19/00* (2018.01)
  *G05B 19/042* (2006.01)

(52) U.S. Cl.
  CPC .......... *G05B 19/0426* (2013.01); *G05B 2219/23333* (2013.01)

(58) Field of Classification Search
  CPC combination set(s) only.
  See application file for complete search history.

(56) References Cited

U.S. PATENT DOCUMENTS

| | | | |
|---|---|---|---|
| 5,012,402 A | * | 4/1991 | Akiyama ........... G05B 19/0421 340/4.36 |
| 5,623,604 A | | 4/1997 | Russell et al. |
| 5,852,733 A | | 12/1998 | Chien et al. |
| 5,887,172 A | | 3/1999 | Vasudevan et al. |

(Continued)

FOREIGN PATENT DOCUMENTS

| | | |
|---|---|---|
| EP | 2498178 A1 | 9/2012 |
| KR | 20080044576 A | 5/2008 |
| WO | WO-2005050503 A1 | 6/2005 |

OTHER PUBLICATIONS

Zhongcheng et al., Web-based Remote Network Control for Smart homes., Jul. 28, 2013, Wuhan University, p. 6568-6571.*

(Continued)

*Primary Examiner* — Kidest Bahta
(74) *Attorney, Agent, or Firm* — Moser Taboada

(57) ABSTRACT

A method and apparatus for remotely modifying behavior of code for a controller-based device is provided. The method comprises receiving a modified profile from a user device at a code virtualization server, the modified profile corresponding to a profile associated with the code for execution on the controller-based device, where the controller-based device is remote to the user device and the code virtualization server, and updating the profile with the modified profile. The code comprises a first code for execution on the controller-based device, and the first code comprises a remote call from the controller-based device to the code virtualization server to cause execution of a second code on the code virtualization server using the updated profile.

18 Claims, 4 Drawing Sheets

(56) References Cited

U.S. PATENT DOCUMENTS

| | | | |
|---|---|---|---|
| 6,065,053 A | 5/2000 | Nouri et al. | |
| 6,108,715 A | 8/2000 | Leach et al. | |
| 6,266,809 B1 | 7/2001 | Craig et al. | |
| 6,324,681 B1 | 11/2001 | Sebesta et al. | |
| 6,366,300 B1 | 4/2002 | Ohara et al. | |
| 6,401,156 B1 | 6/2002 | Mergard et al. | |
| 6,490,723 B1 | 12/2002 | Bearden et al. | |
| 6,715,132 B1 | 3/2004 | Bartz et al. | |
| 6,889,002 B1* | 5/2005 | Hayashi | G01C 21/32 369/94 |
| 6,894,991 B2* | 5/2005 | Ayyagari | H04L 45/04 370/254 |
| 6,895,573 B2 | 5/2005 | Norgaard et al. | |
| 6,931,288 B1 | 8/2005 | Lee et al. | |
| 6,966,039 B1 | 11/2005 | Bartz et al. | |
| 7,010,773 B1 | 3/2006 | Bartz et al. | |
| 7,043,715 B1 | 5/2006 | Bauer et al. | |
| 7,086,014 B1 | 8/2006 | Bartz et al. | |
| 7,127,705 B2 | 10/2006 | Christfort et al. | |
| 7,136,709 B2* | 11/2006 | Arling | G05B 15/02 340/3.1 |
| 7,143,360 B1 | 11/2006 | Ogami et al. | |
| 7,246,319 B2 | 7/2007 | Alden et al. | |
| 7,784,030 B2 | 8/2010 | Christfort et al. | |
| 7,954,150 B2* | 5/2011 | Croft | G06F 3/1415 713/164 |
| 8,028,258 B1 | 9/2011 | Ogami et al. | |
| 8,352,903 B1 | 1/2013 | Friedman | |
| 8,639,644 B1* | 1/2014 | Hickman | G06N 3/008 700/245 |
| 8,694,954 B2 | 4/2014 | Ortiz | |
| 8,752,033 B2 | 6/2014 | Mohammed et al. | |
| 9,148,413 B1 | 9/2015 | Marr et al. | |
| 2002/0078168 A1 | 6/2002 | Christfort et al. | |
| 2002/0169850 A1 | 11/2002 | Batke et al. | |
| 2002/0194313 A1 | 12/2002 | Brannock | |
| 2003/0023839 A1 | 1/2003 | Burkhardt et al. | |
| 2003/0037181 A1 | 2/2003 | Freed | |
| 2003/0051021 A1* | 3/2003 | Hirschfeld | G06F 9/5077 709/223 |
| 2003/0120707 A1 | 6/2003 | Bogdan et al. | |
| 2003/0177208 A1 | 9/2003 | Harvey, IV | |
| 2004/0010734 A1 | 1/2004 | Ghercioiu et al. | |
| 2004/0034842 A1 | 2/2004 | Mantey et al. | |
| 2004/0040028 A1 | 2/2004 | Moreau | |
| 2004/0249944 A1 | 12/2004 | Hosking et al. | |
| 2004/0267926 A1 | 12/2004 | Rothman et al. | |
| 2005/0114644 A1 | 5/2005 | Chu et al. | |
| 2005/0114854 A1 | 5/2005 | Padisetty et al. | |
| 2005/0177269 A1 | 8/2005 | Funk | |
| 2005/0198624 A1 | 9/2005 | Chipman | |
| 2005/0283786 A1 | 12/2005 | Dettinger et al. | |
| 2006/0020910 A1 | 1/2006 | Schlanger et al. | |
| 2006/0041644 A1 | 2/2006 | Henseler | |
| 2006/0041854 A1 | 2/2006 | Schlanger et al. | |
| 2006/0059447 A1 | 3/2006 | Ariyama et al. | |
| 2006/0122730 A1 | 6/2006 | Niemela et al. | |
| 2006/0259588 A1 | 11/2006 | Lerman et al. | |
| 2006/0277158 A1 | 12/2006 | Kim | |
| 2006/0277328 A1 | 12/2006 | Cherian et al. | |
| 2007/0017995 A1* | 1/2007 | Good | G06K 7/10693 235/462.39 |
| 2007/0096757 A1* | 5/2007 | Puente | G01R 31/31926 324/756.04 |
| 2007/0142929 A1 | 6/2007 | Pereira | |
| 2007/0174037 A1 | 7/2007 | Ling | |
| 2007/0179955 A1* | 8/2007 | Croft | G06F 3/1415 |
| 2007/0186246 A1 | 8/2007 | Goldhor | |
| 2007/0234341 A1 | 10/2007 | Chang et al. | |
| 2007/0250800 A1 | 10/2007 | Keswick | |
| 2007/0283072 A1 | 12/2007 | Johnson | |
| 2008/0021994 A1 | 1/2008 | Grelewicz et al. | |
| 2008/0040093 A1 | 2/2008 | Sargaison et al. | |
| 2008/0082603 A1 | 4/2008 | Mansour et al. | |
| 2008/0109782 A1 | 5/2008 | Adelman et al. | |
| 2008/0137572 A1* | 6/2008 | Park | G08C 17/02 370/310 |
| 2008/0163269 A1 | 7/2008 | Goto | |
| 2008/0189697 A1* | 8/2008 | Kachroo | G06F 9/45533 717/171 |
| 2008/0222715 A1 | 9/2008 | Bansal et al. | |
| 2009/0095807 A1 | 4/2009 | Dickerson et al. | |
| 2009/0171484 A1 | 7/2009 | Birze et al. | |
| 2009/0198770 A1 | 8/2009 | Jiang | |
| 2010/0010908 A1 | 1/2010 | Pasupulati et al. | |
| 2010/0205273 A1 | 8/2010 | Shim | |
| 2010/0271989 A1 | 10/2010 | Chernoguzov et al. | |
| 2010/0287571 A1 | 11/2010 | Mohammed et al. | |
| 2010/0299187 A1 | 11/2010 | Duggal | |
| 2010/0333088 A1* | 12/2010 | Rogel | G06F 9/45533 718/1 |
| 2011/0023031 A1* | 1/2011 | Bonola | G06F 8/61 718/1 |
| 2011/0046792 A1* | 2/2011 | Imes | H04L 67/42 700/278 |
| 2011/0154305 A1 | 6/2011 | Leroux et al. | |
| 2011/0179347 A1 | 7/2011 | Proctor et al. | |
| 2011/0238969 A1 | 9/2011 | Warkentin et al. | |
| 2011/0271269 A1 | 11/2011 | Tazzari et al. | |
| 2011/0295391 A1 | 12/2011 | Schneider et al. | |
| 2012/0022674 A1 | 1/2012 | Choo | |
| 2012/0036493 A1 | 2/2012 | Moosmann et al. | |
| 2012/0233588 A1 | 9/2012 | Mruthyunjaya et al. | |
| 2012/0233589 A1 | 9/2012 | Mruthyunjaya et al. | |
| 2012/0233612 A1 | 9/2012 | Beckett | |
| 2013/0125089 A1 | 5/2013 | Mohammed et al. | |
| 2013/0125107 A1 | 5/2013 | Bandakka et al. | |
| 2013/0201316 A1 | 8/2013 | Binder et al. | |
| 2013/0271659 A1 | 10/2013 | Na et al. | |
| 2013/0275560 A1 | 10/2013 | Bestmann et al. | |
| 2013/0290856 A1* | 10/2013 | Beveridge | G06F 9/4445 715/740 |
| 2014/0040182 A1 | 2/2014 | Gilder et al. | |
| 2014/0052945 A1* | 2/2014 | Ashok | G06F 3/0608 711/159 |
| 2014/0109057 A1 | 4/2014 | Gibbens et al. | |
| 2014/0123124 A1 | 5/2014 | Gray et al. | |
| 2014/0215433 A1 | 7/2014 | Bergamaschi et al. | |
| 2014/0258986 A1 | 9/2014 | Wang et al. | |
| 2014/0372963 A1 | 12/2014 | Chandaria et al. | |
| 2015/0045960 A1 | 2/2015 | Caron et al. | |
| 2015/0046902 A1 | 2/2015 | Kumar et al. | |
| 2015/0127192 A1 | 5/2015 | Phatak et al. | |
| 2016/0012026 A1 | 1/2016 | Baikov et al. | |

OTHER PUBLICATIONS

Marshall, "Remote Procedure Calls (RPC)", <https://www.cs.cf.ac.uk/Dave/C/node33.html>, Jan. 5, 1999, pp. 1-14.
Benso et al., "A Software Development Kit for Dependable Applications in Embedded Systems", Conference: Proceedings IEEE International Test Conference, 2000.
Alonso et al., "Computer Networks Exercise 4", ETH, 2006, pp. 1-6.
Battaglia et al., "An Open and Portable Software Development Kit for Handheld Devices with Proprietary Operating Systems", IEEE Transactions on Consumer Electronics, vol. 55, Issue 4, Nov. 2009, pp. 2436-2444.
Krzyzanowski, "Remote Procedure Calls", Oct. 30, 2012.
Bergen, "RPC Automation: Making Legacy Code Relevant", 8th International Symposium on Software Engineering for Adaptive and Self-Managing Systems (SEAMS), 2013, pp. 175-180.
Kasai, "Embedded Middleware and Software Development Kit for Area-Based Distributed Mobile Cache System", IEEE Transactions on Consumer Electronics, vol. 59, Issue 1, Feb. 2013, pp. 281-289.
International Search Report and Written Opinion dated Oct. 30, 2014 for PCT Application No. PCT/US2014/046215.
International Search Report and Written Opinion dated Oct. 31, 2014 for PCT Application No. PCT/US2014/042783.

(56) References Cited

OTHER PUBLICATIONS

International Search Report and Written Opinion dated Oct. 31, 2014 for PCT Application No. PCT/US2014/042774.
International Search Report and Written Opinion dated Nov. 3, 2014 for PCT Application No. PCT/US2014/042780.
International Search Report and Written Opinion dated Apr. 22, 2015 for PCT Application No. PCT/US2015/010562.
International Search Report and Written Opinion dated Aug. 11, 2016 for PCT Application No. PCT/US2016/031217.
International Search Report and Written Opinion dated Oct. 4, 2016 for PCT Application No. PCT/US2016/041573.
Feipeng Liu, "Android Native development Kit Cookbook", Mar. 1, 2013, XP055326992, ISBN: 978-1-84969-150-5, retrieved on Dec. 7, 2016 from: http://file.allitebooks.com/20150520/Android%20Native%20Development%20Kit%20Cookbook.pdf, pp. 1-331.
International Search Report and written Opinion dated Apr. 13, 2017 for PCT Application No. PCT/US2016/067944, 14 pgs.
International Search Report and Written Opinion dated Nov. 15, 2017 for PCT Application No. PCT/US2017/047944.

* cited by examiner

METHOD AND APPARATUS FOR MODIFYING BEHAVIOR OF CODE FOR A CONTROLLER-BASED DEVICE

CROSS-REFERENCE TO RELATED APPLICATIONS

This application claims priority to U.S. Provisional Patent Application No. 62/190,408 filed on Jul. 9, 2015, U.S. Provisional Patent Application No. 62/158,636, filed May 8, 2015, and U.S. Provisional Patent Application No. 62/270,107, filed Dec. 21, 2015, each of which is incorporated by reference herein in its entirety.

BACKGROUND OF THE INVENTION

Field of the Invention

Embodiments of the present invention generally relate to a method and apparatus for modifying behavior of code for controller-based devices.

Description of the Related Art

The use of field programmable gate arrays (FPGAs) and other controller-based devices (e.g. microcontroller or microprocessor based), such as MCU, SoC, mobile phones, computers, etc. have grown considerably popular. Low manufacturing costs, availability, and customization of controllers have led to a proliferation of microcontrollers and Systems on a Chip (SoC) (e.g., PIC, ARDUINO, RASPBERRY PI and the like) being used by commercial companies and hobbyists alike for creation of devices. Controller-based devices include a processor core and a memory, which are programmable for processing input/output data in communication with peripherals. Program memory in the form of NOR FLASH or OTP ROM is also often included on such controller-based devices, as well as a small amount of random access memory (RAM). Several such controller-based devices are designed for embedded applications within larger devices.

Real world applications of such controller-based devices can potentially include connecting controller-based devices with conventional objects or systems as peripherals, thereby enabling digitization, connectivity and even remote control of such peripherals. However, several challenges exist in making such real world applications accessible to average users, particularly those with limited or no programming and hardware knowledge.

Configuring the peripherals (conventional objects or systems) for use with controller-based devices is, in general, quite complex. Further, in several applications of controller-based devices, ability to accommodate dynamic inputs and/or generate dynamic output, may be desirable. Configuring and programming controller-based devices to accommodate dynamic inputs or outputs requires writing or rewriting the code for all controller-based devices, and is very challenging for average users because rewriting code or reprogramming the controller-based devices needs an understanding of hierarchies of the peripherals and suitable controller-based devices for the peripherals, coding commands, proper calling syntaxes, and other programming parameters. In the absence of accurate code, a program will fail to run or produce errors. Further, rewriting programs every time a modification in input, output, or any other change in code behavior is required, can be cumbersome and excessively time consuming, even in simple and small groups of such controller-based devices. In several cases, reprogramming or rewriting code may be nearly as laborious as programming or writing the code for the first time.

Further, as the "Internet of Things (IoT)" grows, more and more such controller-based devices are connected to one another and/or to the Internet, significantly increasing the complexity of reprogramming associated with achieving desired code behavior. Groups of such devices may communicate with one another and/or to a gateway such that the gateway becomes a proxy for the Internet communications for the so-called edge devices. The edge devices may communicate through one or more gateways, or directly as independent devices. Within a group, all the devices (gateway and edge) must be programmed in a compatible manner to facilitate interoperability. In addition to reprogramming according to the customization for achieving desired code behavior, managing compatibility every time a customization is implemented may also be excessively time consuming.

Thus, there is a need in the art for modifying behavior of code for a controller-based device efficiently, and reducing at least some of the problems described above.

SUMMARY OF THE INVENTION

Embodiments of the present invention generally relate to a method and apparatus for remotely modifying behavior of code for a controller-based device, substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
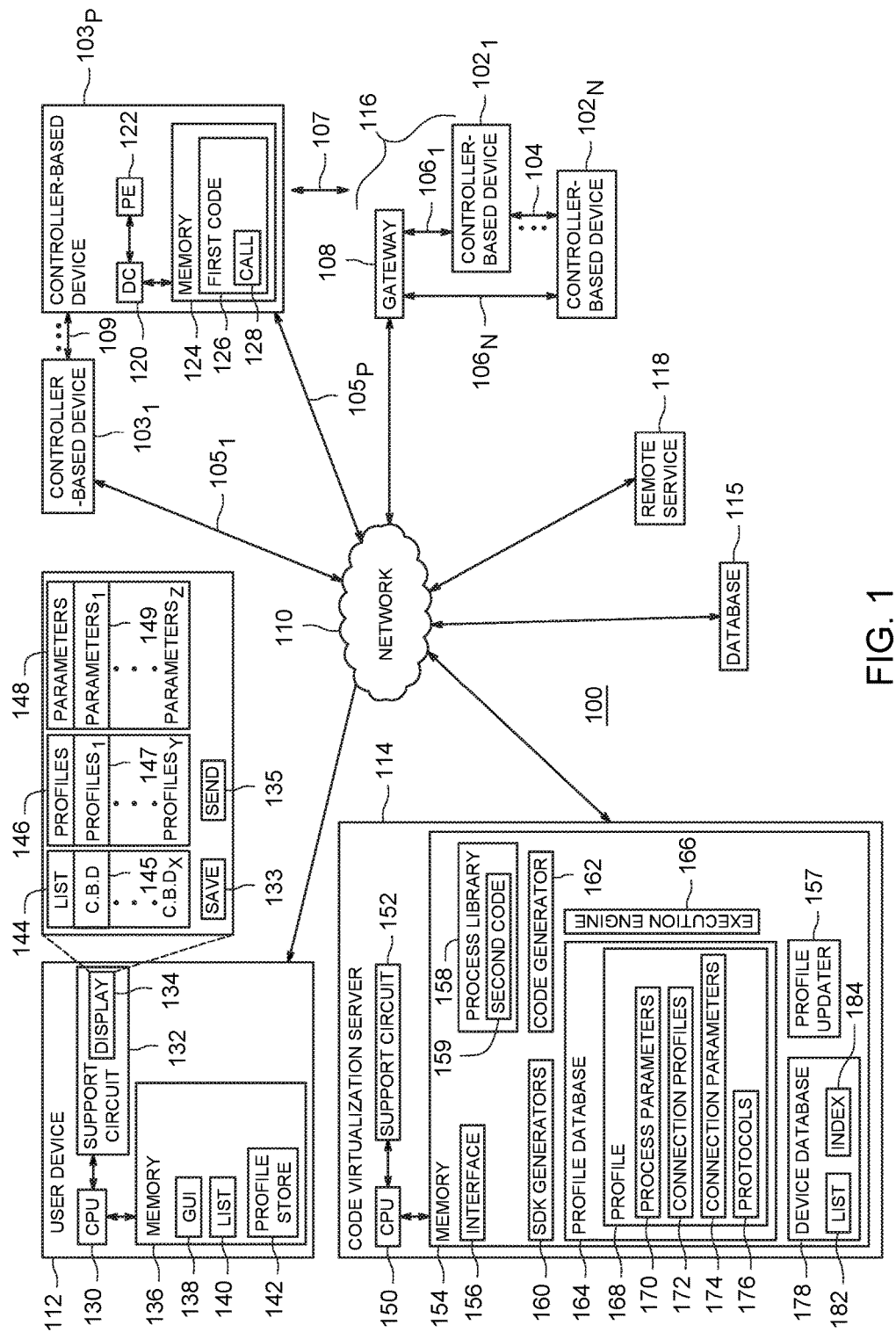
FIG. 1 is a block diagram of a system 100 for modifying code behavior remotely, in accordance with an embodiment of the present invention.

Embodiments of the present invention relate to method and apparatus for remotely modifying behavior of code for edge and gateway devices (also referred to as "controller-based devices," or "CB devices" for brevity), and more specifically to modifying profile(s) associated with the code for the controller-based device, without changing the code itself. The code for the controller-based device is executed using the modified profile, thereby modifying the code behavior without requiring re-writing the entire code for the controller-based device. The code deployed on the controller-based device (a "first code") includes a call for executing a function (a "second code") on a remote device, e.g. a server. Code deployed on the controller-based device (the first code) and the remote function (the second code) together form the code for, or associated with, the controller-based device. Profiles are associated with and used for implementing such code for the controller-based device(s) (e.g., devices having a controller, such as microcontrollers, microprocessors, SoC, MCU, among others). The profiles are modified and stored on a device remote to controller-based devices, for example, a code virtualization server, which may also be the remote device executing the second code. Embodiments of the present invention, using a graphical user interface (GUI) on a user device, enable a user to select a controller-based device remote to the user device, access a profile associated with code for the controller-based device, modify the profile remotely, and initiate execution of the code with the modified profile. Implementing the code with the modified profile achieves desired modified code behavior, without requiring a modification of the code itself. Consequently, behavior of code for execution a controller-based device is controlled or modified remotely without having to reprogram the controller-based device.

As used herein, the terms "code associated with a controller-based device," "code for a controller-based device" and "code for execution on a controller-based device," may be used interchangeably unless otherwise apparent from the context. The code for the controller-based device includes the first code, which is executed on the controller-based device, and the second code, which is called by the first code for execution on a device remote to the controller-based device. The second code is executed using a profile, which is therefore associated with the second code. The profile is also associated with the first code, which calls for executing the second code. In this manner, the profile is also associated with the code for execution on the controller-based device.

Commonly assigned patent application Ser. No. 11/853,137, filed 11 Sep. 2007, Ser. No. 11/853,143, filed 11 Sep. 2007, and Ser. No. 12/931,292, filed 28 Jan. 2011 (now U.S. Pat. No. 8,726,285) describe techniques for generating, deploying and executing workflows remotely. Commonly assigned patent application Ser. No. 14/307,198, filed 17 Jun. 2014, Ser. No. 14/307,208, filed 17 Jun. 2014, Ser. No. 14/307,227, filed 17 Jun. 2014, Ser. No. 14/328,415, filed 10 Jul. 2014, Ser. No. 14/593,151, filed 9 Jan. 2015, and Ser. No. 14/685,064, filed 13 Apr. 2015, describe techniques for automatic generation of code and SDK, virtualization of code and SDK, generating remote process calls for code virtualization. The listed applications describe techniques for developing software automatically for a controller-based device incorporating a controller, mapping the use of hardware such as sensors or actuators to the controller remotely using a graphical user interface, and executing the software, e.g. remotely, to extend the capabilities of such a controller-based device via defined workflows. Each of the applications listed above is incorporated herein by reference in its entirety.

These techniques function by placing a snippet of code and/or a library in the memory of the controller-based device, wherein the snippet, when executed, calls a function (or a portion of code) for being executed on a remote device, for example, a code virtualization server, and/or sends (directly, or via the code virtualization server) data to a remote service which is remote to the code virtualization server, and/or further calls a function to be remotely performed on the data by the remote service. These techniques are used for creating and managing controller-based solutions comprising controller-based devices, including generating programs for the controller-based devices. Embodiments of the present invention use these techniques to modify code behavior of programs for a controller-based device. With such embodiments, code behavior can be modified in dynamic environments, for example, where inputs for the code need to be changed, or a different output is required, or both. Further, the embodiments enable modifying the code behavior remotely, for example, by a user using a user computer remote to a device on which the code is executed.

FIG. 1 is a block diagram of a system 100 for modifying code behavior remotely, in accordance with one or more embodiments of the present invention. The system 100 comprises multiple controller-based devices $102_1 \ldots 102_N$ (collectively referred to as controller-based devices 102), multiple controller-based devices $103_1 \ldots 103_P$ (collectively referred to as controller-based devices 103), gateway 108, Internet 110, a user computer 112, a code virtualization server 114, an optional database 115, and a remote service 118.

The controller-based devices 102 and the gateway 108 form a group of devices (or device group 116) connected to the Internet 110. The device group 116 communicates between controller-based devices 102 and the gateway 108 along communications paths $106_1 \ldots 106_N$. Although the communications paths are generally wireless paths, in some embodiments, the paths may be wired. In addition, in some embodiments, the controller-based devices 102 may be able to communicate amongst themselves along dashed paths $104_1 \ldots 104_N$. The controller-based devices 103 communicate directly with the Internet 110, and amongst themselves along dashed path 109. Although a single gateway 108 is depicted, a plurality of gateways 108 may be used within the group or spanning multiple groups, similar to the device group 116. Each of controller-based devices 102, controller-based devices 103, and the gateway 108 comprises a controller, e.g., a microcontroller or a processor that can be programmed either remotely or through direct connection from the user device 112. In some embodiments, microcontroller of each of the controller-based devices 102, the controller-based devices 103 and the gateway 108 can be programmed by the code virtualization server 114.

Each controller-based device (edge devices 102, 103, and the gateway 108) includes a device controller (DC), peripheral electronics (PE), and a memory. For example, and for the sake of brevity, only the controller-based device $103_P$ is shown to include the device controller 120, peripheral electronics 122 and a memory 124, although each device (edge devices 102, 103 and the gateway 108) includes a device controller and a memory, and may include peripheral electronics. The device controller 120 includes one or more of a microcontroller (e.g., PIC, AVR type, ARM type, and the like), a system on chip (SoC, e.g., RASPBERRY PI), or a microprocessor as generally known in the art. The type of controller may differ from device to device, for example, based on the application of such device and the functionality required. The peripheral electronics 122 include, but are not limited to, sensors, lights, audio speakers, actuators, displays, printers, scanners, I/O devices and the like. The peripheral electronics 122 comprise components to manage or operate a conventional system, or the peripheral electronics 122 are themselves a conventional system, such as a music system, an alarm, household appliances, electrical devices, electro-mechanical devices, among several others. The memory 124 is any form of digital storage used for storing data and executable software. Such memory includes, but is not limited to, random access memory, read only memory, disk storage, optical storage, and the like. The memory 124 stores computer readable instructions corresponding to an operating system (not shown), a first code 126, which further includes a call 128 to a second code on a device remote to the controller-based device $103_P$, for example, the code virtualization server 114. The first code 126 may include an automatically generated controller program (AGCP) code, and other code components (not shown) which include libraries necessary for executing the first code 126 and the call 128. The code components are also capable of ensuring that a controller-based device can communicate to the code virtualization server 114 via or without a gateway 108, and similar code components in the gateway 108 are capable of allowing such communications.

The user device 112 comprises a CPU 130, support circuits 132 and a memory 136. The CPU 130 may be any commercially available processor, microprocessor, microcontroller, and the like. The support circuits 132 comprise well-known circuits that provide functionality to the CPU such as a user interface, clock circuits, network communications, cache, power supplies, I/O circuits, and the like. The I/O circuits include a display 134, for example, various standard or touch-based displays, such as computer monitors as generally known in the art. In some embodiments, the user interface comprises a keypad, electronic buttons, speaker, touchscreen, display, or other user interaction mechanism. The memory 136 is any form of digital storage used for storing data and executable software. Such memory includes, but is not limited to, random access memory, read only memory, disk storage, optical storage, and the like. The memory 136 stores computer readable instructions corresponding to an operating system (not shown), a graphical user interface (GUI) 138, a list 140 of controller-based devices for which modification of code behavior is available using the present embodiments, and a profile store 142 for storing one or more profiles received from the code virtualization server 114, or modifications thereto. The user device 112 is coupled to the network 110 when selecting a controller-based device for modifying code behavior, generating and sending a modified profile for modifying code behavior, and receiving the results of execution of the modified code for display. The GUI 138 retrieves a list of controller-based devices (102, 103, 108) for modifying behavior of code (e.g. first code) installed on the controller-based devices (102, 103, 108) from the code virtualization server 114. The GUI 138 also retrieves profile(s) associated with code installed on one or more controller-based devices included in the list 140, and such retrieved profile(s) may be stored in the profile store 142 before and after modification. In some embodiments, the GUI 138 is a software resident on the code virtualization server, rendered on the user device via a browser on the user device 112. In some embodiments (not shown), the list 140 and the profile store 142 reside on the code virtualization server 114, and is displayed on the user device 112 via the browser.

The GUI 138 (displayed directly or via the browser) is rendered on the display 134. The list 140 is displayed in the GUI 138 as a selectable list 144, from which one or more of controller-based devices ($CBD_1 \ldots CBD_x$) may be selected. A selectable list of profiles 146, retrieved by the GUI 138 from the code virtualization server 114, includes one or more profiles ($Profile_1 \ldots Profile_y$) corresponding to the selected controller-based device. Each profile includes a list of parameters 148 ($Parameter_1 \ldots Parameter_z$). A user may request the list 140, which may be requested from the code virtualization server 114, and once retrieved, be displayed as the list 144, from which the user selects $CBD_1$ (or "CBD 145") for remotely modifying the behavior of the code for CBD 145. Upon receiving the selection of CBD 145, the GUI 138 retrieves profile(s) associated with the code for CBD 145 (code for being executed on the CBD, and/or code associated therewith) and presents the list of profiles 146 for selection by the user. The user selects $Profile_1$ (or "Profile 147"), and the GUI 138 displays the list of parameters 148 contained in the profile 147. The user selects Parameter) (or "parameter 149") for modifying the parameter 149 to modify behavior of code for CBD 145 as desired. The user may modify one or more parameters using the I/O devices, as generally known in the art, and may similarly modify one or more parameters and profiles corresponding one or more controller-based devices included in the list 140. The modified profiles are stored in the profile store 142, for example, using the "SAVE" button 133, and sent to the code virtualization server 114, for example, using the "SEND" button 135. The above description only illustrates one possible GUI layout scheme, and does not limit the techniques described herein to such illustration.

In some embodiments (not shown), the GUI 138 also displays results of modified code behavior on the display 134. In some embodiments (not shown), the GUI 138 includes an integrated development environment (IDE) for creating and/or modifying programs for the controller-based devices, and testing and deploying the programs to the controller-based devices 102, 103 and/or the gateways 108. Alternative embodiments may use algorithms on a custom Application Specific Integrated Circuit (ASIC) to provide the functionality provided by the any combination of the CPU 130, the support circuits 132 and the memory 136. In some embodiments, the I/O devices include comprises a keypad, electronic buttons, speaker, touchscreen, display, or other user interaction mechanism.

The code virtualization server 114 may be a general-purpose computer or other electronic processing device that is programmed to be a specific purpose computer to perform functions related to embodiments of the present invention. The code virtualization server 114 comprises a CPU 150, support circuits 152, and a memory 154 containing instructions and algorithms. The CPU 150 may be any commercially available processor, microprocessor, microcontroller, and the like. The support circuits 152 comprise well-known circuits that provide functionality to the CPU such as a user interface, clock circuits, network communications, cache, power supplies, I/O circuits, and the like. Alternative embodiments may use control algorithms on a custom Application Specific Integrated Circuit (ASIC) to provide the functionality provided by the any combination of the CPU 150, the support circuits 152 and the memory 154. In some embodiments, the user interface comprises a keypad, electronic buttons, speaker, touchscreen, display, or other user interaction mechanism. In some embodiments, the user interface may communicate with the controller-based devices 102, 103 and 108.

The memory 154 may be any form of digital storage used for storing data and executable software. Such memory includes, but is not limited to, random access memory, read only memory, disk storage, optical storage, and the like. The memory stores computer readable instructions corresponding to an interface 156, a profile updater 157, a process library 158, a software development kit (SDK) generator 160, a code generator 162, a profile database 164, an execution engine 166, and a device database 178.

The interface 156 provides functionality for the user device 112 to interact with the code virtualization server 114. In some embodiments, the interface 156 may also include GUI software, for example, corresponding to the GUI 138, which may be sent by the code virtualization server 114 to the user device, or otherwise provided to a user for installation on the user device 112. In some embodiments, the interface 156 includes software to render the GUI 138 through a browser on the user device 112. In addition, the interface 156 provides connections to the controller-based devices 102, 103, 108 and the remote service 118. The profile updater 157 updates the profile 168 using a modified profile, for example, received from the user device 112. The profile updater 157 modifies one or more parameter(s) of the profile 168 according to the corresponding parameter(s) of the modified profile. The profile updater 157 further stores the updated profile to, or as, the profile 168. In some embodiments, the profile updater 157 is included in the interface 156. The process library 158 comprises code (i.e. a second code 159, also referred to as "choreographs" or "choreos") that may be executed upon receiving a call from the controller-based device. According to some embodiments, the second code is executed using a profile updated based on a modified profile received from the user device 112. According to some embodiments, the second code performs certain off controller-based device functions that the device controller of the controller-based device would otherwise not be able to perform. The SDK generator 160 generates an SDK for supporting execution of the first code, the second code or both, for example, by providing necessary code libraries according to the hardware, software platform, communication infrastructure and other code execution parameters. The code generator 162 creates the first code for controller-based device, and the first code includes a call from a controller-based device to the code virtualization server 114 for executing the second 159 using a profile associated with the controller-based device. The profile database 164 comprises at least one profile 168 corresponding to at least one process (e.g. the second code 159) of the process library 158. The profile 168 includes process parameters 170 and a list thereof, connection profiles 172 including user data such as user names, identification information and passwords, connection parameters 174, and protocols 176 relating to execution of the second code 159. The profile 168 may also include parameters such as profile name, for example a name of a set of parameters (includes all sub-profiles), hardware profile parameters, such as Hardware type or Processor Type, and for example, Arduino Uno, Arduino Yun are examples of Hardware type, and AVR, ARM, PIC are examples of Processor type. Examples of profile parameters are illustrated, without limitation, in Table 1. The profile 168 is set up according to the desired behavior of the second code 159. The profile database 164 includes several profiles (not shown) similar to the profile 168. The device database 178 comprises a list 182 of controller-based devices 102, 103, 108 for which the code behavior may be modified, and an index 184 referencing profiles, for example, the profile 168, with one or more controller-based devices, for example, the controller-based device $103_P$. The information included in the profile database 164 and the device database 178 may be distributed in one or more databases on the code virtualization server 114, or optionally on devices on the network 110, for example, a database 115.

According to embodiments of the present invention, the profile updater 157 updates the profile 168 using a modified profile received from the user device 112 via the GUI 138. Executing the first code 126 on the controller-based device $103_P$ places the call 128 to execute the second 159 on the code virtualization server 114 using the updated profile 168. The execution engine 166 executes the second code 159 using the updated profile 168, resulting in a code behavior according to the updated profile 168. In this manner, behavior of the code (i.e., the first code and the second code) associated with the controller-based device $103_P$ is modified, for example, remotely from the code, without modifying the code itself.

TABLE 1

| Type | Parameter | Example/Comments |
|---|---|---|
| General | Profile name | Name of a set of parameters (includes all sub-profiles) |
| Hardware Profile | Hardware type | Arduino Uno, Arduino Yun, Samsung Artik, Raspberry PI, etc. |
| Hardware Profile | Processor type | AVR, ARM, PIC, etc. |
| Hardware Profile | Network Hardware | Arduino Wifi Shield, Built-in Ethernet, Ethernet Shield, BLE Shield, Built-in BLE |
| Credential Profile | Username | Username for a webservice like Facebook, . . . |
| Credential Profile | Password | Password for a webservice like Facebook, . . . |
| Credential Profile | API Key | Developer API key given by webservices like Facebook, . . . There can be several API keys |
| Credential Profile | API Secret | Developer API secret given by webservices like Facebook, . . . There can be several API secrets |
| Connection Profile | Connection Profile name | Allows to select different Connection profiles |
| Connection Profile | Type | Wifi, Bluetooth, Zigbee, . . . |
| Connection Profile | Security Type | WPA, WEP, unsecured, . . . |
| Connection Profile | SSID | Wifi network identifier |
| Connection Profile | Password | Network password |
| Connection Profile | Transport Protocol | MQTT, CoAP, HTTP/S, . . . |
| Connection Profile | Role | Gateway or Edge |
| Setup Profile | Output Pin | Indicates which Output Pin is selected on the processor (multiple Output Pins can be selected) |
| Setup Profile | Input Pin | Indicates which Input Pin is selected on the processor (multiple Input Pins can be selected) |
| Setup Profile | Pin Rule | Specifies what rule is applied to a given Pin (Input or Output). For example: If Temperature = 19 then write High to Pin 12 |
| Input Profile | Required Input Parameter | Also called variable. Can be any parameter a choreo needs to be executed. Can be multiple Input Parameters. For example, a choreo sending an email will need Input Parameters like: Email address, Subject, Body, Attachment, . . . |
| Input Profile | Optional Input Parameter | Optional Input parameters are used to add Parameters that are not necessary. Multiple Optional Input Parameters are possible. For example, a choreo sending an email has optional Input Parameters like: CC, BCC or encryption type |

The execution engine 166 supports all the foregoing functions to facilitate interoperability between the various components of the apparatus 100. The execution engine utilizes each of the functional blocks described above to enable a user to program controller-based devices to control and modify their functionality through a GUI on the user device.

The remote service 118 includes private or public services provided by third party servers or databases (i.e., devices) that are remote to the user device 112, the code virtualization server 114, and the controller-based devices (102, 103, 108). For example, the remote service 118 includes third party databases and services (e.g., AMAZON, EBAY, FACEBOOK, APPLE PUSH NOTIFICATION servers, text message servers, email servers, and the like), or an internal data source (e.g., DB, noSQL DB, files and the like). The remote service 118 is accessible to the code virtualization server 114 via the network 110 or another network. According to some embodiments, the remote service 118 is provisioned by executing, using the execution engine 166, the second code 159 using the updated profile 168.

The network 110 comprises the Internet, or a wide area network (WAN) or a combination, and may include one or more such networks. All the components of the apparatus 100 are connected to the network 110 or to each other as illustrated in FIG. 1, using known methods and components.

Figure 2:
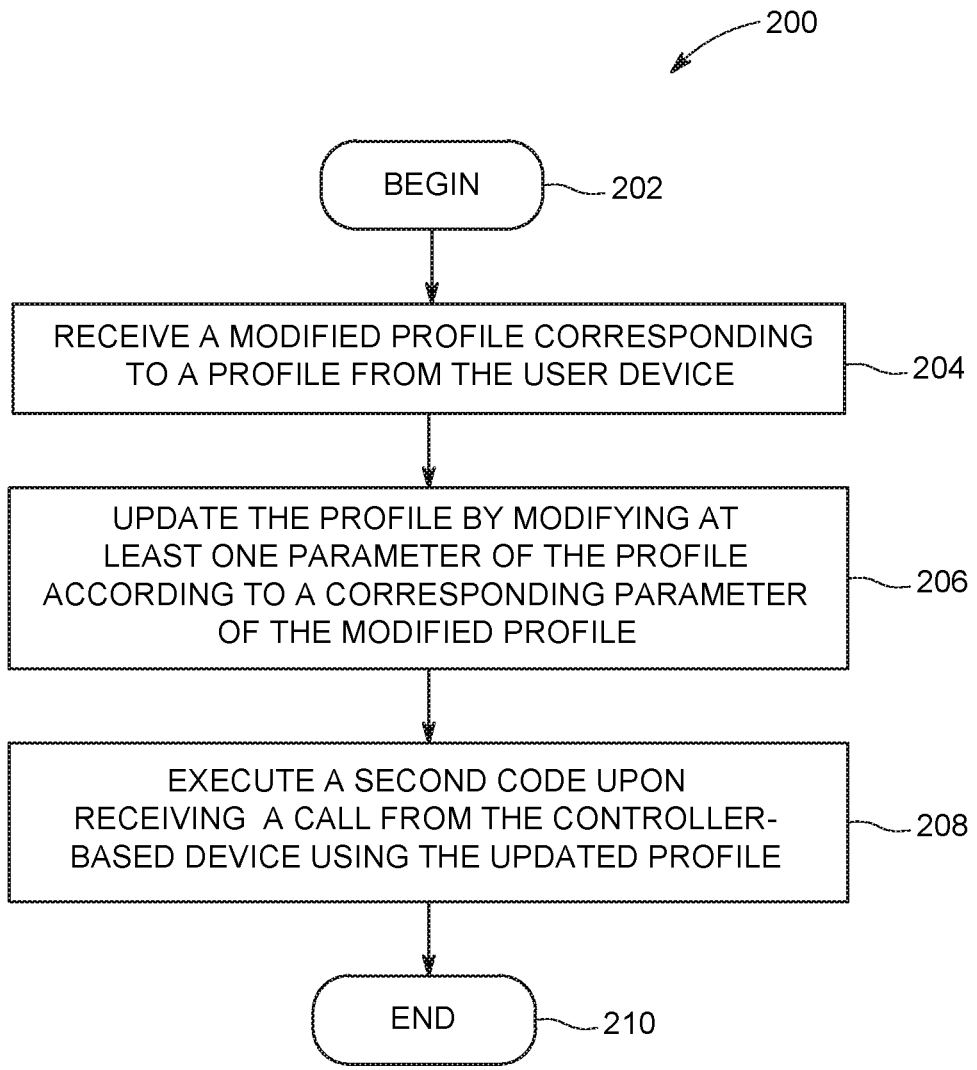
FIG. 2 is flow diagram of a method for modifying behavior of code for a controller-based device by changing a profile associated with a process as executed by the code virtualization server of FIG. 1, in accordance with an embodiment of the invention.

FIG. 2 depicts a flow diagram of a method 200 executed by the code virtualization server 114 for modifying behavior of code associated with a controller-based device, remotely, by updating a profile used for execution of the code associated with the controller-based device, in accordance with embodiments of the present invention. The method 200 begins at step 202 and proceeds to step 204. At step 204, the code virtualization server 114 receives, from the user device 112, a modified profile corresponding to a profile used for execution of code (e.g. a first code 126 and/or a second code 159) associated with a controller-based device, for example, the controller-based device $103_P$. In some embodiments, the profile updater 157 receives the modified profile from the GUI 138. The method 200 proceeds to step 206, at which the method 200 updates the profile used for execution of the code with the modified profile. According to some embodiments, the profile updater 157 modifies at least one parameter of the profile 168 to the same value as a corresponding parameter of the modified profile. The method 200 proceeds to step 208, at which, upon receiving a call from the controller-based device $103_P$ to execute a second code (e.g. the second code 159) on the code virtualization server 114, the method 200 executes the second code using the updated profile. According to some embodiments, the execution engine 166 executes the second code 159 using the updated profile 168, resulting in a modification of behavior of the code associated with the controller-based device $103_P$. The method 200 then proceeds to step 210, at which, the method 200 ends.

Figure 3:
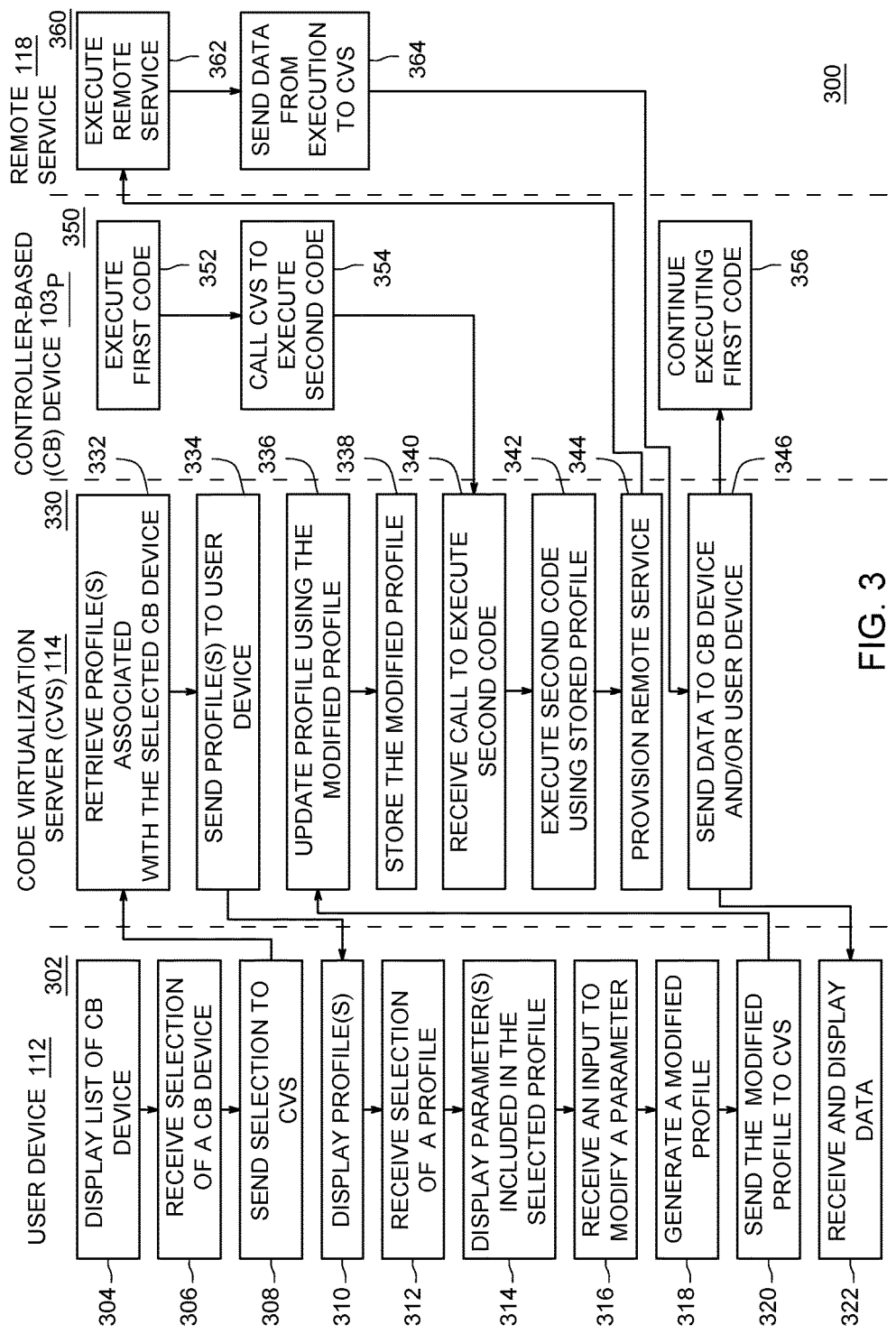
FIG. 3 is a flow diagram of a method 300 executed by various devices of the apparatus 100 of FIG. 1, for modifying behavior of code for execution with a controller-based device, in accordance with an embodiment of the invention.

FIG. 3 depicts a flow diagram of a method 300 executed by various devices of the apparatus 100 of FIG. 1, for modifying behavior of code for execution with a controller-based device, by changing a profile associated with the code, in accordance with embodiments of the present invention. The user device 112 executes a method 302, the code virtualization server 114 executes a method 330, the controller-based device $130_P$ executes a method 350 and the remote service 118 executes a method 360, and the methods 302, 330, 350 and 360 combine to provide the functionality of the method 300. Hereon, reference will be made to various steps described herein as the steps of method 300, although it is apparent that each step is also one of the methods 302, 330, 350 and 360.

At step 304, the method 300 displays a list 140 of controller-based devices, for example using the GUI 138 on the display 134, as discussed above. The list may be a list (e.g. the list 182) of controller-based devices 102, 103, 108 sent by the code virtualization server in response to a request by the user device 112, or the list may be otherwise provided to the user device 112. In some embodiments, the user device 112 stores the list as the list 140. At step 306, the method 300 receives a selection of a controller-based device, for example, the controller-based device $130_P$, via the GUI 138, which is sent, at step 308, to the code virtualization server 114.

Execution of the method 300 shifts to the code virtualization server 114 at step 332, at which the method 300 retrieves one or more profile(s), for example, the profile 168 and other profiles associated with code for execution on the controller-based device $103_P$. The method 300 proceeds to step 334, at which, the profile 168 and other profiles are sent to the user device 112 for modification.

Execution of the method 300 shifts to the user device at step 310, at which the method 300 displays the received profiles including the profile 168, for example, using the GUI 138. At step 312, the method 300 receives a selection of a profile, for example, the profile 168 (e.g. as an input entered by a user at the user device 112, or an input from another file or database selected by the user) to modify the profile 168. At step 314, the method 300 displays one or more parameter(s) included in the profile 168 for being modified or updated. At step 316, the method 300 receives an input to modify a parameter of the profile 168, and at step 318, the method 300 generates a modified profile with the parameter modified at step 316. The method 300 may receive multiple inputs associated with multiple parameters, and generate the modified profile accordingly. According to some embodiments, the method 300 generates the modified profile using the GUI 138. Further, the method 300 optionally stores the modified profile, for example, in the profile store 142. At step 320, the method 300 sends the modified profile to the code virtualization server 114.

Execution of the method 300 shifts to the code virtualization server 114 at step 336, at which the method 300 updates the profile 168 using the modified profile. The method 300 updates the profile 168 using the profile updater 157 by updating each parameter according to a corresponding parameter of the modified profile, or replaces the profile 168 with the modified profile, and at step 338, the method 300 stores the modified profile as the profile 168. In this manner, steps 304-320 and steps 332-338 achieve updating the profile 168 using a modified profile. For brevity, discussion of the method 300 is made with reference to a single profile, for example, the profile 168, although the steps of the method 300 can be extended to incorporate multiple profiles, as would occur readily to those skilled in the art. Further steps relate to executing code associated with the controller-based device $103_P$ using the updated profile to modify the behavior of the code.

At step 352, the method 300 executes the first code 126 on the controller-based device $103_P$. The method 300 proceeds to step 354, at which the first code 126 calls, via the call 128, the code virtualization server 114 for executing the second code 159 on the code virtualization server 114.

Execution of the method 300 shifts to the code virtualization server 114 at step 340, at which the method 300 receives the call 128 from the user device 112. At step 342, the code virtualization server 114 executes the second code 159 using the profile 168, which has been updated using a modified profile, as described above. Execution of the second code 159 using the updated profile 168 causes a difference in the behavior of the second code 159, and thereby, the behavior of the first code 126. However, neither the first code 126, nor the second code 159 requires modification. In some embodiments, the method 300 includes an optional step 344 to provision the remote service 118 as part of executing the second code 159. By updating the profile 168, the code behavior related to provisioning of the remote service 118 is modified. For example, the profile modification may result in change of the remote service (FACEBOOK, AMAZON, etc.) used, the account used, text displayed, among several other parameters, as desired.

If the optional step 344 is executed, execution of the method 300 shifts to the remote service 118, which may be provided by one or more servers remote to the controller-based device $103_P$, the code virtualization server 114, or the user device 112. At step 362, the method 300 executes remote service 118 in accordance with the second code 159, and, for example, according to the modified profile 168 parameters. At step 364, the method 300 sends data resulting from execution of the remote service 118 to the code virtualization server 114. Data resulting from the execution of the remote service 118 may include a status update on whether the provisioning of the remote service was successful, or any output of the remote service 118.

Execution of the method 300 shifts to the code virtualization server 114 at step 346, at which the method 300 sends the data resulting from provisioning of the remote service 118 to the controller-based device $103_P$, and optionally, the user device 112.

Execution of the method 300 shifts to the controller-based device $103_P$ at step 356, at which the method 300 continues to execute the first code 126. If the optional step 344 is not executed, then the execution of the method 300 shifts to the controller-based device $103_P$ at step 356 after the step 342. Further, in some embodiments, execution of the first 128 on the controller-based device $103_P$ terminates after step 354, and in such embodiments, the method 300 does not execute the step 356.

If at step 346, the data is sent to the user device 112, execution of the method 300 shifts to the user device step 322, at which the method 300 receives and displays the data, for example, via the GUI 138 on the display 134.

Advantageously, all other processes associated with the code, for example, development, testing, deployment of the code are preserved, that is, no modification is required to such processes. Therefore, modifying the profile in accordance with the disclosed embodiments allow to modify the code behavior without requiring to modify the code itself, and without requiring to re-execute the steps of development, testing and deployment.

Figure 4:
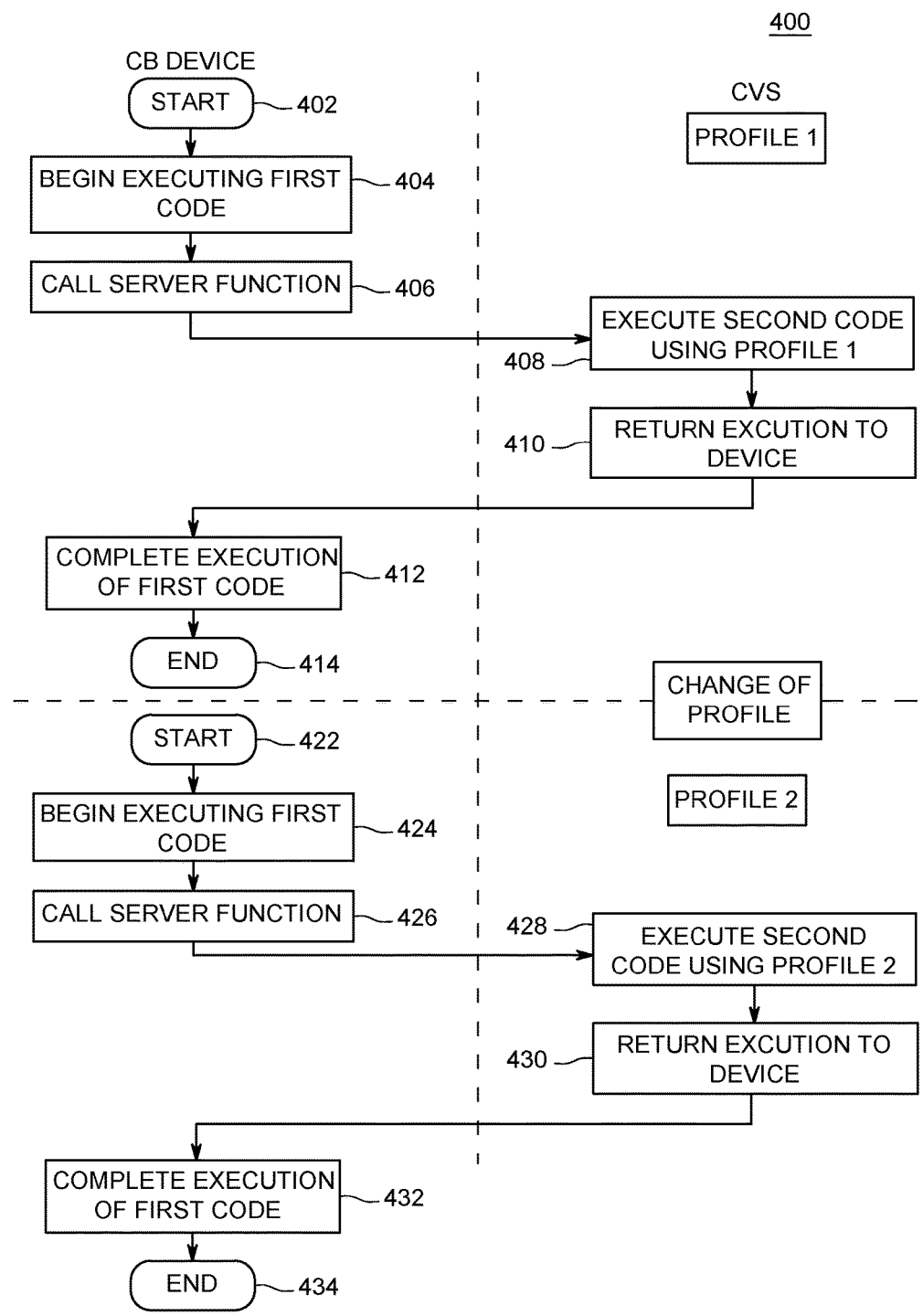
FIG. 4 is a flow diagram of a method executed by at least one controller-based device and the code virtualization server of FIG. 1 for controlling code behavior for the at least one controller-based device, in accordance with an embodiment of the invention.

FIG. 4 is a flow diagram of a method 400, executed by at least one controller-based device (102, 103, 108), for example, the controller-based device $103_P$ and the code virtualization server 114, for controlling code behavior for the at least one controller-based device of FIG. 1 in accordance with an embodiment of the invention. The method 400 starts at step 402 on the controller-based device, and proceeds to step 404 at which the method 400 begins executing code (e.g. the first code 126) on the controller-based device $103_P$. The first code 126 includes predefined program code or process associated with the controller-based device $103_P$. The first code 126 includes one or more call(s) 128 to a function provided by the code virtualization server 114. At step 406, the call is made from the controller-based device $103_P$ to the code virtualization server 114, and the method 400 switches to the code virtualization server 114. The method 400 proceeds to step 408, at which the method 400 executes code corresponding to the called function (e.g. the second code 159) on the code virtualization server 114, using a first profile (or PROFILE 1) stored on the code virtualization server 114. Upon executing the step 408 on the code virtualization server 114, at step 410, the method 400 returns execution of the code to the controller-based device $103_P$. At step 412, the method 400 completes the execution of the first code 126 on the controller-based device $103_P$. In some embodiments, the first code 126 execution may complete at the step 410 on the code virtualization server 114, and no additional execution of code may take place at step 412. The method 400 proceeds to step 414, where the method 400 ends.

Steps 402-414 describe execution of the code for the controller-based device $103_P$ using PROFILE 1 which is stored as the profile 168. For example, in an embodiment, the controller-based device $103_P$ is a temperature sensor configured to turn on heating when temperature drops below a predetermined value. When the temperature drops below the predetermined value, the code is executed using PROFILE 1. Specifically, upon a condition being met (the temperature dropping below the predetermined value) the first code 128 is configured to turn on the heating, and call (via the call 128) the code virtualization server 114 for provisioning a remote service 118 (e.g. posting a predefined text on FACEBOOK). Upon receiving the call 128, the code virtualization server 114, executes the second 159 using the PROFILE 1, which include a user's login credentials and predefined text. Executing the second 159 results in generating a FACEBOOK post from the user's account stating, "Heating has been turned on." This outcome is a first behavior of the code (the first code 128 and the second code 159) for the controller-based device $103_P$.

According to some embodiments of the invention, the first profile (PROFILE 1) is modified or updated by the user to a second profile (PROFILE 2), for example, using the method 200 described with respect to FIG. 2, or steps 304-320 and steps 332-338 described in the method 300 of FIG. 3. Thereby, the profile 168 is updated to PROFILE 2. The method 400 is then executed using the second profile, PROFILE 2, in a similar manner as steps 402-414, and for example, as described below with respect to steps 422-434.

The method 400 starts at step 422 on the controller-based device $103_P$, and proceeds to step 424 at which the method 400 begins executing code (e.g. the first code 126) on the controller-based device $103_P$. The first code 126 includes predefined program code or process associated with the controller-based device $103_P$. The first code 126 includes one or more call(s) 128 to a function provided by the code virtualization server 114. At step 426, the call 128 is made from the controller-based device $103_P$ to the code virtualization server 114, and the method 400 switches to the code virtualization server 114. The method 400 proceeds to step 428, at which the method 400 executes code corresponding to the called function (e.g. the second code 159) on the code virtualization server 114 using an updated profile (or PROFILE 2) stored on the code virtualization server 114. Upon executing the step 428 on the code virtualization server 114, at step 430, the method 400 returns execution to the controller-based device $103_P$. At step 432, the method 400 completes the execution of the first code 126 on the controller-based device $103_P$. In some embodiments, the first code 126 execution may complete at the step 430 on the code virtualization server 114, and no additional execution of code may take place at step 432. The method 400 proceeds to step 434, where the method 400 ends.

Steps 422-434 describe execution of the code for the controller-based device $103_P$ using PROFILE 2, which is stored as the profile 168 after modification of the profile 168 using the techniques described above. Continuing the example in which the controller-based device $103_P$ is a temperature sensor configured to turn on heating when temperature drops below a predetermined value. When the temperature drops below the predetermined value, the code is now executed using PROFILE 2. Specifically, upon a condition being met (the temperature dropping below the predetermined value) the first code 128 is configured to turn on the heating, and call (via the call 128) the code virtualization server 114 for provisioning a remote service 118 (e.g., posting a different text on TWITTER). Upon receiving the call 128, the code virtualization server 114, executes the second 159 using the PROFILE 2, which include a user's login credentials for TWITTER and predefined text. Executing the second 159 results in generating a TWITTER post from the user's account stating, "It is really cold out here!" This outcome is a second behavior of the code (the first code 128 and the second code 159) for the controller-based device $103_P$. In this manner, the described embodiments enable modifying behavior of the code for the controller-based device $103_P$, without having to rewrite or modify the code itself.

Further, while the described example only changes the behavior with respect to provisioning of a different service and posting a different text, the combination of the code and profiles may be configured to provide a wide-ranging modification of code behavior. Such variations in configuring the code and the profiles will occur readily to those skilled in the art without departing from the scope and spirit of the present invention as defined in the present claims. Techniques illustrated by various embodiments discussed herein make controlling or modifying the code behavior quick and easy for a user, by avoiding the need to reprogram each controller-based device individually. In some embodiments, the code virtualization server 114 is implemented as a service (not shown) that provides access to code generation, deployment, remote reprogramming through a web interface by default, or any GUI (e.g., a smartphone app or a computer application). While the embodiments are described with respect to Internet of things (IoT) devices, those skilled in the art will readily appreciate that the techniques exemplified by the disclosed embodiments are applicable to several other programming environments.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations, and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer-implemented method for remotely modifying behavior of code for a controller-based device, comprising:
   receiving a modified profile from a user device at a code virtualization server, the modified profile being a modification of a profile associated with a code for the controller-based device,
   the code for the controller-based device comprising a first code for execution on the controller-based device and a second code for execution on the code virtualization server,
   the first code comprising a remote call from the controller-based device to the code virtualization server, the remote call configured to cause execution of the second code on the code virtualization server,
   the profile comprising at least one parameter for being used to execute the second code, and
   where the controller-based device is remote to the user device and the code virtualization server;
   updating the profile with the modified profile on the code virtualization server; and
   executing the second code on the code virtualization server using the updated profile upon receiving the remote call at the code virtualization server from the controller-based device, the execution of the second code using the updated profile causing a modification of the behavior of the code for the controller-based device.

2. The method of claim 1, wherein the updating comprises modifying the at least one parameter of the profile according to a corresponding parameter of the modified profile.

3. The method of claim 1, further comprising:
   sending a list of a plurality of controller-based devices from the code virtualization server to a user device, the list for display on the user device; and
   receiving, from the user device, a selection of the controller-based device from the plurality of controller-based devices for modifying behavior of the code for the controller-based device.

4. The method of claim 3, further comprising:
   retrieving the profile for being updated using the modified profile; and
   sending the profile to the user device for display.

5. The method of claim 4, wherein the list is sent for display at a graphical user interface (GUI) of the user device, the selection is received via the GUI, and the modified profile is received via the GUI.

6. The method of claim 1, further comprising storing the profile after being updated using the modified profile.

7. The method of claim 1, wherein the execution of the second code initiates provisioning of at least one remote service using the profile, the remote service being provisioned on devices remote to the controller-based device, the user device and the code virtualization server.

8. The method of claim 7, further comprising sending data related to the provisioning of the at least one remote service, after the provisioning of the at least one remote service, to at least one of the user device or the controller-based device.

9. An apparatus for remotely modifying behavior of code for a controller-based device, the apparatus comprising a code virtualization server comprising:
 a processor; and
 a memory comprising executable instructions, which when executed using the processor, cause execution of a method comprising:
  receiving a modified profile from a user device at the code virtualization server, the modified profile being a modification of a profile associated with a code for the controller-based device,
  the code for the controller-based device comprising a first code for execution on the controller-based device and a second code for execution on the code virtualization server,
  the first code comprising a remote call from the controller-based device to the code virtualization server, the remote call configured to cause execution of the second code on the code virtualization server,
  the profile comprising at least one parameter for being used to execute the second code, and
  where the controller-based device is remote to the user device and the code virtualization server
  updating the profile with the modified profile on the code virtualization server, and
  executing the second code on the code virtualization server using the updated profile upon receiving the remote call at the code virtualization server from the controller-based device, the execution of the second code using the updated profile causing a modification of the behavior of the code for the controller-based device.

10. The apparatus of claim 9, further comprising an index cross-referencing the controller-based device with at least one profile including the profile.

11. The apparatus of claim 9, wherein the updating comprises modifying the at least one parameter of the profile according to a corresponding parameter of the modified profile.

12. The apparatus of claim 9, wherein the method further comprises:
 sending a list of a plurality of controller-based devices from the code virtualization server to a user device for display on the user device; and
 receiving, from the user device, a selection of the controller-based device from the plurality of controller-based devices for modifying behavior of the code for with the controller-based device.

13. The apparatus of claim 12, wherein the method further comprises:
 retrieving the profile for being updated using the modified profile; and
 sending the profile to the user device for display.

14. The apparatus of claim 13, wherein the list is sent for display at a graphical user interface (GUI) of the user device, the selection is received via the GUI, and the modified profile is received via the GUI.

15. The apparatus of claim 9, wherein the method further comprises storing the profile after being updated using the modified profile.

16. The apparatus of claim 9, wherein the execution of the second code initiates provisioning of at least one remote service using the profile, the remote service being provisioned on devices remote to the controller-based device, the user device and the code virtualization server.

17. The apparatus of claim 16, wherein the method further comprises sending data related to the provisioning of the at least one remote service, after the provisioning of the at least one remote service, to at least one of the user device or the controller-based device.

18. A non-transitory computer readable media for storing computer instructions for remotely modifying behavior of code for a controller-based device, that when executed by at least one processor cause the at least one processor to perform a method comprising:
 displaying a list of controller-based devices on a graphical user interface (GUI) on a user device;
 receiving, on the GUI, a selection of a controller-based device from the list;
 sending the selection from the user device to a code virtualization server;
 receiving, on the user device, from the code virtualization server, a profile comprising at least one parameter for being used to execute the code for the controller-based device;
 displaying the profile via the GUI;
 receiving via the GUI, an input to modify the at least one parameter of the profile;
 generating, at the user device, a modified profile using the input, the modified profile being a modification of the profile; and
 sending the modified profile from the user device to the code virtualization server.

* * * * *